(12) United States Patent
Kim et al.

(10) Patent No.: US 10,898,882 B2
(45) Date of Patent: Jan. 26, 2021

(54) SURFACE-MODIFIED BORON NITRIDE NANOSTRUCTURE AND METHOD FOR PRODUCING SAME

(71) Applicant: Naieel Technology, Daejeon (KR)

(72) Inventors: Jaewoo Kim, Daejeon (KR); Young-Soo Seo, Seoul (KR); Tae Jin Kim, Smithtown, NY (US); Jun Ki Kim, Gyeonggi-do (KR); Won-Il Lee, Seoul (KR); Duckbong Seo, Daejeon (KR)

(73) Assignee: NAIEEL TECHNOLOGY, Daejeon (KR)

( * ) Notice: Subject to any disclaimer, the term of this patent is extended or adjusted under 35 U.S.C. 154(b) by 0 days.

(21) Appl. No.: 16/252,940

(22) Filed: Jan. 21, 2019

(65) Prior Publication Data

US 2019/0329228 A1    Oct. 31, 2019

(30) Foreign Application Priority Data

Apr. 27, 2018   (KR) .................. 10-2018-0049240
Nov. 2, 2018    (KR) .................. 10-2018-0133760

(51) Int. Cl.
| | | |
|---|---|---|
| *B01J 27/24* | (2006.01) | |
| *C01B 21/064* | (2006.01) | |
| *B01J 23/42* | (2006.01) | |
| *B01J 23/44* | (2006.01) | |
| *B01J 35/00* | (2006.01) | |
| *B01J 37/34* | (2006.01) | |
| *B01J 37/02* | (2006.01) | |

(52) U.S. Cl.
CPC .............. *B01J 27/24* (2013.01); *B01J 23/42* (2013.01); *B01J 23/44* (2013.01); *B01J 35/0013* (2013.01); *B01J 37/0217* (2013.01); *B01J 37/0221* (2013.01); *B01J 37/343* (2013.01); *C01B 21/0648* (2013.01); *C01P 2002/85* (2013.01); *C01P 2004/04* (2013.01); *C01P 2004/13* (2013.01); *C01P 2004/24* (2013.01)

(58) Field of Classification Search
None
See application file for complete search history.

(56) References Cited

U.S. PATENT DOCUMENTS

2012/0273733 A1* 11/2012 Sainsbury ........... C01B 21/0648
                                                              252/500

FOREIGN PATENT DOCUMENTS

KR      1020190125151      11/2019

OTHER PUBLICATIONS

Lu et al.; Boron Nitride Nanosheet-Anchored Pd—Fe Core-Shell Nanoparticles as Highly Efficient Catalysts for Suzuki-Miyaura Coupling Reactions; ACS Appl. Mater. Interfaces; 9, 2469-2476; Jan. 4, 2017.*

(Continued)

*Primary Examiner* — Guinever S Gregorio
(74) *Attorney, Agent, or Firm* — Sand, Sebolt & Wernow Co., LPA

(57) ABSTRACT

The boron nitride nanostructure according to an embodiment of the present invention forms defects through surface modification and incorporates the metallic nanoparticles on the surface defects.

3 Claims, 14 Drawing Sheets
(5 of 14 Drawing Sheet(s) Filed in Color)

(56) References Cited

OTHER PUBLICATIONS

Jeffrey C. S. Wu, et al. Deep Oxidation of Methanol Using a Novel Pt/Boron Nitride Catalyst. Department of Chemical Engineering, National Taiwan University, Taipei, Taiwan 10617, R.O.C. Ind. Eng. Chem. Res. 2003, 42, 3225-3229. Jun. 7, 2003.

Mirjam Volkmann, et al. Attachment of Colloidal Nanoparticles to Boron Nitride Nanotubes. Institute of Physical Chemistry, University of Hamburg, Matrin-Luther-King-Platz 6, 20146 Hamburg, Germany. Dec. 16, 2016.

* cited by examiner

SURFACE-MODIFIED BORON NITRIDE NANOSTRUCTURE AND METHOD FOR PRODUCING SAME

CROSS-REFERENCE TO RELATED APPLICATIONS

This application claims the priority of Korean Patent Applications No. 10-2018-0049240 filed on Apr. 27, 2018, and No. 10-2018-0133760 filed on Nov. 2, 2018, in the Korean Intellectual Property Office, the disclosure of which is incorporated herein by reference.

BACKGROUND

Field

The present invention relates to a surface-modified boron nitride nanostructure and a method for producing the same, and more particularly, to a method for producing a boron nitride nanostructure having a high oxidation-reduction reactivity by modifying the surface of a boron nitride nanostructure.

Description of the Related Art

Boron nitride nanotubes (BNNT), which represents boron nitride nanostructures, are considered as the next generation nanomaterials and expected to play an important role as a core basic material in industries such as IT/IoT, electronics, energy, environment, space, nuclear power, and biomedical, etc. with excellent mechanical strength, electrical insulation, thermal conductivity, piezoelectric property, neutron shielding, and catalytic properties, etc.

Currently there are needs to take the initiative in the global market through the development of advanced manufacturing technology, process, and system for mass production of boron nitride nanotubes (BNNT), while it is not sufficient worldwide to secure the originality of the products to which the boron nitride nanotube (BNNT) is applied, and to improve the competitiveness of the manufacturing technology for the boron nitride nanotube (BNNT), to promote its industrial utilization, and to expand the global market.

Especially, regarding on the environmental issues, as the "Paris Agreement" was propelled during the Paris Convention in 2015, many countries are seeking for highly efficient reduction schemes of the greenhouse gas emission and toxic gases.

For example, reducing major pollutants of automobile exhaust, such as carbon monoxide (CO), hydrocarbons (HC), and nitrogen oxides (NOx), is one of the most important factor for the minimization of the fine dust, which is a serious social and environmental problem in the world in recent years. Moreover, it is also the negative factor that the prices of precious metals (for example, Pt, Pd, and Rh) that are widely used as the catalysts for CO, HC, and/or NOx oxidation and reduction are expected to continue to rise due to increasing demand while supplying of these natural resources is insufficient. (As of 2018, the prices of Pt, Pd and Rh are $32,673/kg, $35,610/kg, and $39,224/kg, respectively.)

Therefore, it is necessary to develop catalysts that increase oxidation and/or reduction efficiency of environmentally hazardous gases while reducing the use of such precious metal catalysts.

Although non-precious metal catalysts (for example, Ni, Fe, and Co, etc.) have been studied to replace the precious metal catalysts, they do not show the reaction rate as high as that of precious metal catalysts. Particularly, there is a problem that the oxidation-reduction reaction rate is decreased due to a change in the catalytic structure at a high temperature, that is, as the temperature rises, the particles begin to agglomerate by the migration of the particles, and thus, the specific surface area of the metal catalyst particles is steeply reduced.

In the case of heterogeneous catalysts, metal oxide or ceramics are often used, but problems such as sintering and changes in oxidation state at high temperature are known as disadvantages.

As described above, even though various materials have been developed so far, critical problems such as the low conversion rate, the decrease in activity due to the change of the catalytic structure, and the high cost related to limited availability in nature have been raised.

In comparison, boron nitride nanotubes (BNNTs) show the characteristics such as a high specific surface area, relatively easy surface structure change and thermal/chemical stability. In these regards, BNNT has drawn a great attention for the industrial application especially in the production of propylene from propane oxidative dehydrogenation reaction, which is critical in the refinery process, as well as the oxidation-reduction reaction of hazardous gases.

However, a boron nitride nanotube (BNNT) has great crystallinity, and thus presents low reactivity when used by itself.

Therefore, there is a need for the enhancement of more efficient catalytic effects of BNNT by improving chemical reactivity of boron nitride nanotube (BNNT).

PRIOR ART DOCUMENT

Patent Document

Korean Patent Laid-Open Publication No. 10-2015-0143798 (2015 Dec. 23)

SUMMARY

An object of the present invention is to provide a low-cost and highly efficient catalyst by modifying the surface and positioning a very small amount of metallic nanoparticles on the surface of a boron nitride nanostructure to increase the catalytic efficiency.

The problems to be solved by the present invention are not limited to the above-mentioned problem(s), and other problem(s) that are not mentioned can be clearly understood by those skilled in the art from the following description.

The boron nitride nanostructure according to an embodiment of the present invention produces the defects through the surface modification.

In addition, a boron nitride nanostructure according to an embodiment of the present invention is any one selected from the group consisting of boron nitride nanotubes (BNNT), boron nitride nanosheets (BNNS), and hexagonal boron nitride (h-BN), or a combination thereof.

In addition, in the boron nitride nanostructure according to an embodiment of the present invention, the metallic nanoparticles are incorporated in the defects produced on the surface of boron nitride nanostructures.

In addition, the metallic nanoparticles according to an embodiment of the present invention are any one selected from the group consisting of platinum (Pt), palladium (Pd), gold (Au), silver (Ag), iron (Fe), cobalt (Co), nickel (Ni), copper (Cu), chromium (Cr), molybdenum (Mo), tungsten (W), ruthenium (Ru), rhodium (Rh), iridium (Ir), vanadium (V), and alloys thereof, or a combination thereof.

In addition, the metallic nanoparticles according to an embodiment of the present invention may be included in an amount of 0.1 to 15 wt %.

In addition, the metallic nanoparticles according to an embodiment of the present invention may be included in an amount of 0.1 to 3 wt %.

In addition, a method for surface modification of a boron nitride nanostructure according to an embodiment of the present invention includes: mixing the boron nitride nanostructure with a neutral solution to prepare a first mixture; mixing the first mixture with a metallic precursor solution to prepare a second mixture; and performing ultrasonic dispersion of the second mixture to generate the defects on the surface of the boron nitride nanostructure.

In addition, the formation of the defects on the surface of the boron nitride nanostructure through the ultrasonic dispersion according to an embodiment of the present invention is performed using the implosion of the micro-bubbles at the interface between the surface of the boron nitride nanostructure and the solution.

In addition, the method may further include incorporation of the metallic nanoparticles in the defects after generation of the defects on the surface of the boron nitride nanostructure according to an embodiment of the present invention.

In addition, the ultrasonic dispersion according to an embodiment of the present invention is performed from 1 hour up to 10 hours.

In addition, the formation of the metallic nanoparticles on the defects according to an embodiment of the present invention is structured by physical embedding of the metallic nanoparticles produced from the metallic precursor.

According to one embodiment of the present invention, in a boron nitride nanostructure, the defects are formed by surface modification of the boron nitride nanostructure, and metallic nanoparticles are incorporated on the surface, thereby providing more stable and efficient catalysts especially in high temperature and extreme environments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENT

Figure 1:
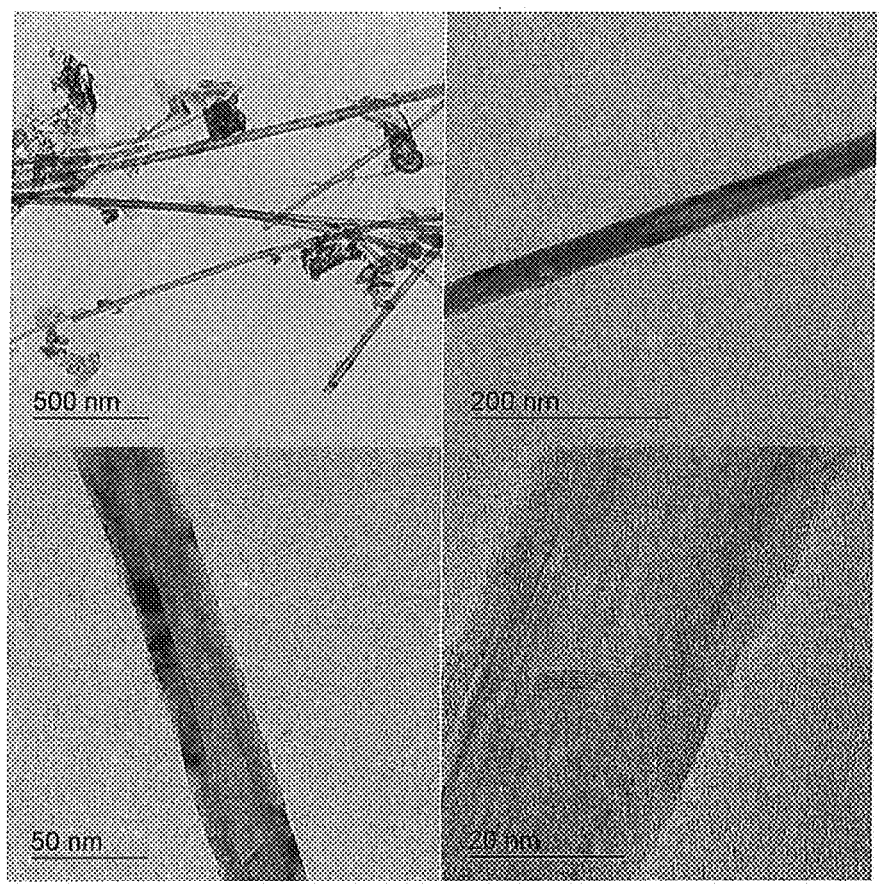
FIG. 1 is a TEM image of a boron nitride nanotube (BNNT) prior to embedding of the metallic nanoparticles.

The advantages and/or features of the present invention and methods for achieving the same will become apparent from the following description of preferred embodiments given in conjunction with the accompanying drawings. It should be understood, however, that the present invention is not limited to the embodiments disclosed herein but may be embodied in many different forms. Rather, the embodiments disclosed herein are provided in order to ensure that the disclosure becomes thorough and perfect and to ensure that the scope of the invention is sufficiently delivered to a person having an ordinary knowledge in the relevant art. The present invention is defined only by the claims. Throughout the specifications, the same reference numbers refer to the same constituents.

Generally, boron nitride nanostructures that are not surface modified and/or changed are excellent in thermal and chemical stability, and thus are advantageous as a remover or absorber of CO, HC, NOx, $CO_2$, and other pollutants. However, it is also true that the surface is too stable, and thus there is a restriction for it to be utilized as a catalyst. Therefore, the present inventors prepared a highly reactive boron nitride nanostructure by attaching the metallic nanoparticles through surface modification of the boron nitride nanostructure, in particular, the boron nitride nanotubes.

In addition, the present inventors completed the present invention by confirming the highly effective catalytic experimental results using the prepared boron nitride nanostructure catalyst.

The boron nitride nanostructure according to an embodiment of the present invention is characterized by forming the defects through the surface modification of the boron nitride nanostructure.

In addition, the boron nitride nanostructure according to an embodiment of the present invention is characterized in that metallic nanoparticles are incorporated in the defects and that the metallic nanoparticles are included in an amount of 0.1 to 30 wt %.

In addition, the boron nitride nanostructure according to an embodiment of the present invention is characterized in that the metallic nanoparticles are incorporated in the defects and that the metallic nanoparticles are included in an amount of 0.1 to 15 wt %.

Preferably, the metallic nanoparticles may be included in an amount of 0.1 to 10 wt %, more preferably 0.1 to 5 wt %.

More preferably, the metallic nanoparticles may be included in an amount of 0.1 to 3 wt %, still more preferably 0.1 to 2.0 wt %.

In addition, the metallic nanoparticles according to an embodiment of the present invention may be one selected from the group consisting of platinum (Pt), palladium (Pd), gold (Au), silver (Ag), iron (Fe), cobalt (Co), nickel (Ni), copper (Cu), chromium (Cr), molybdenum (Mo), tungsten (W), ruthenium (Ru), rhodium (Rh), iridium (Ir), vanadium (V), and alloys thereof, or a combination thereof, but the present invention is not limited thereto.

In addition, the boron nitride nanostructure according to an embodiment of the present invention may be any one selected from the group consisting of boron nitride nanotubes (BNNT), boron nitride nanosheets (BNNS), and hexagonal boron nitride (h-BN), or a combination thereof, but the present invention is not limited thereto.

In addition, a method for surface modification of the boron nitride nanostructure according to an embodiment of the present invention may include: mixing the boron nitride nanostructure with a neutral solution to prepare a first mixture; mixing the first mixture with a metallic precursor solution to prepare a second mixture; performing ultrasonic dispersion of the second mixture to generate the defects on the surface of the boron nitride nanostructure, and forming the metallic nanoparticles on the defect.

In addition, the formation of the defects through the ultrasonic dispersion according to an embodiment of the present invention is formed based on the implosion of the micro-bubbles generated on the surface of the boron nitride nanostructures.

Specifically, when the second mixture is subjected to ultrasonic treatment, micro-bubbles are formed on the surface of the boron nitride nanostructure due to different surface energy between two different materials, and the micro-bubbles of solution are produced on the surface due to different surface tension and negative pressure. The liquid enters the bubbles and bursts under pressure (cavitation phenomenon). At this time, defects are created through local energy generated on the surface, and the metallic precursor in the second mixture is produced and physically embedded to the defect.

The metallic precursor may be any one selected from the metallic precursors of the metallic nanoparticles listed above or a combination thereof, but the present invention is not limited thereto.

Hereinafter, the present invention will be described in more detail with reference to specific examples. However, the following examples are for illustrative purposes only in order to facilitate the understanding of the present invention, and the scope of the present invention should not be construed as being limited thereto.

The boron nitride nanotube (BNNT) raw material is inactive and does not exhibit polarity, in fact it exhibits slight polarity due to unbalanced electrons between boron and nitrogen atoms, and thus is not well dispersed in the solution with polarity such as water. It also includes impurities such as unwanted metals, carbon, boron, and oxygen inherently produced from the manufacturing process, and thus is difficult to be used as a catalyst. Accordingly, the purified boron nitride nanotube (BNNT) is first obtained and the boron nitride nanotube (BNNT) associated with the metallic nanoparticles is obtained through the modification of the surface.

Example 1: Preparation of Purified Boron Nitride Nanotubes (BNNT)

1 g of a raw boron nitride nanotube (BNNT) was added to 200 ml of 3M HCl to prepare a first solution, and the first solution was dispersed for 2 hours by an ultrasonic apparatus to remove metallic impurities such as Fe and Mg remaining in the boron nitride nanotube (BNNT) sample.

Then, the first solution was stirred at 90° C. for 3 hours using a magnetic stirrer under nitrogen atmosphere, and then 1M nitric acid (100 mL) was added to prepare a second solution. The second solution was also treated at 90° C. for 3 hours to remove above impurities further.

The second solution was filtered to obtain a boron nitride nanotube (BNNT), washed with a neutral solution (DI Water) until it became neutral, and then dried at 90° C. to prepare the purified boron nitride nanotubes (BNNT).

Additionally, in order to increase the purity of the purified boron nitride nanotubes (BNNT), a purified boron nitride nanotube (BNNT) was prepared by using the heat treatment of the sample at 800° C. for 2 hours in an air atmosphere to induce the oxidation reaction of boron impurity, a step of mixing the nanotube with a neutral solution (DI Water) at 90° C. to dissolve the water-soluble boron oxide generated during the heat treatment, washing the sample with a neutral solution (DI Water), and then drying the sample at 90° C.

Example 2: Preparation of Boron Nitride Nanotube (BNNT) Catalyst (Pt-BNNT)

250 mg of the boron nitride nanotube (BNNT) obtained in Example 1 was placed in a neutral solution (DI Water (250 ml)) and dispersed using an ultrasonic apparatus to form the microbubbles on the surface of the boron nitride nanotubes (BNNT).

The defects induced by cavitation are produced on the surface of the boron nitride nanotube (BNNT) through local energy generated by the implosion of the produced microbubbles by the different surface energy.

1.3 ml of H2PtCl6(H2PtCl6 8 wt % in H2O) was mixed with the above dispersion solution to bind the metallic nanoparticles to the defect, and then the mixture was reacted for 10 hours using an ultrasonic apparatus (40 kHz, 100 W) to prepare a target solution.

The prepared solution was filtered to remove unreacted Pt particles and dried at 80° C. for 12 hours to prepare a boron nitride nanotube (BNNT) catalyst (Pt-BNNT).

Example 3: Preparation of Low-Concentration Boron Nitride Nanotube Catalyst (Pt-BNNT)

A low-concentration boron nitride nanotube catalyst (Pt-BNNT) was prepared by using the platinum added in Example 2 in an amount of 2.06 wt % based on pure boron nitride nanotubes (BNNT).

Example 4: Preparation of Boron Nitride Nanosheet (BNNS) Catalyst (Pt-BNNS)

250 mg of hexagonal boron nitride (h-BN) was placed in a neutral solution (DI Water (250 ml)) and dispersed using an ultrasonic apparatus to produce micro-bubbles on the surface of the boron nitride nanotube (BNNT).

The defects induced by cavitation are generated on the surface of the boron nitride nanotube (BNNT) through local energy generated by implosion of the produced micro-bubbles by the different surface energy.

1.3 ml of H2PtCl6(H2PtCl6 8 wt % in H2O) was mixed with the above dispersion solution to bind the metallic nanoparticles to the defect, and then the mixture was reacted for 10 hours using an ultrasonic apparatus (40 kHz, 100 W) to prepare a target solution.

The prepared solution was filtered to remove unreacted Pt particles and dried at 80° C. for 12 hours to prepare a boron nitride nanosheet (BNNS) catalyst (Pt-BNNS).

Example 5: Preparation of Boron Nitride Nanotube Catalyst (Pd-BNNT)

250 mg of the boron nitride nanotube (BNNT) obtained in Example 1 was placed in a neutral solution (DI Water (250 ml)) and dispersed by using an ultrasonic apparatus to form a BNNT solution to produce micro-bubbles on the surface of the boron nitride nanotube (BNNT).

The defects induced by cavitation are generated on the surface of the boron nitride nanotube (BNNT) through local energy generated by implosion of the produced micro-bubble by the different surface energy.

125 mg of Pd(NO3)2.xH2O powder (Pd content, 40%) was placed in a neutral solution (DI water (125 ml)) to bind the metallic nanoparticles to the defect, and the Pd dispersion solution (Pd(NO3)2.xH2O powder in Di Water—2.5 mg/ml, Pd in DI Water—1 mg/ml) was obtained using an ultrasonic apparatus (40 kHz, 100 W). Then, the Pd dispersion solution was mixed with the BNNT solution and reacted for 10 hours using an ultrasonic apparatus (40 kHz, 100 W) to prepare a target solution.

The target solution was filtered to remove unreacted Pd particles and dried at 80° C. for 12 hours to prepare a boron nitride nanotube (BNNT) catalyst (Pd-BNNT).

Example 6: Preparation of Low-Concentration Boron Nitride Nanotube Catalyst (Pd-BNNT)

A low-concentration boron nitride nanotube catalyst (Pd-BNNT) was prepared by using the palladium added in Example 5 in an amount of 2.31 wt % based on pure boron nitride nanotubes (BNNT).

Example 7: Analysis of Results

FIG. 1 is a TEM image of a boron nitride nanotube (BNNT) prior to binding of the metallic nanoparticles.

It can be confirmed that nothing is bonded to the surface of the boron nitride nanotube (BNNT) as illustrated in FIG. 1.

Figure 2:
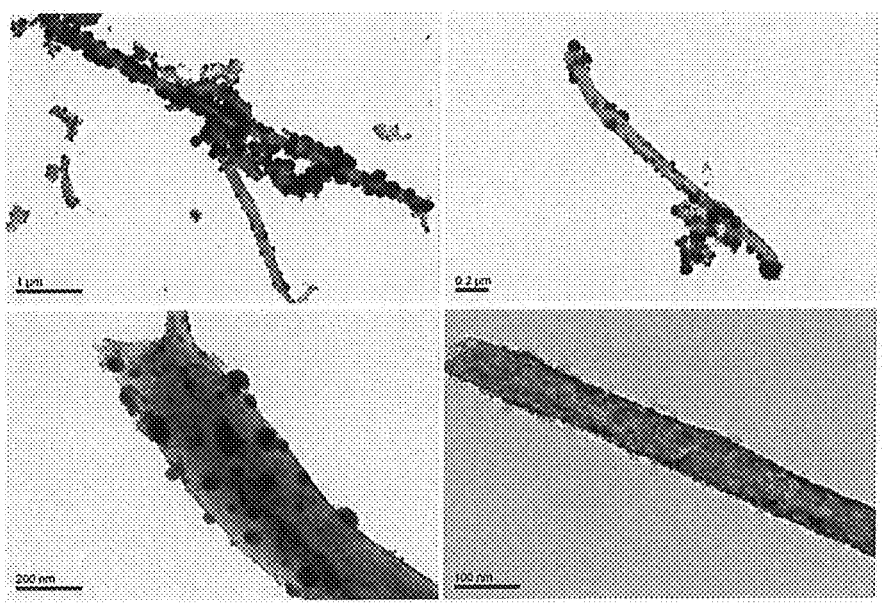
FIG. 2 is a TEM image of a boron nitride nanotube (BNNT) catalyst (Pt-BNNT) according to the second embodiment of the present invention.
Figure 3:
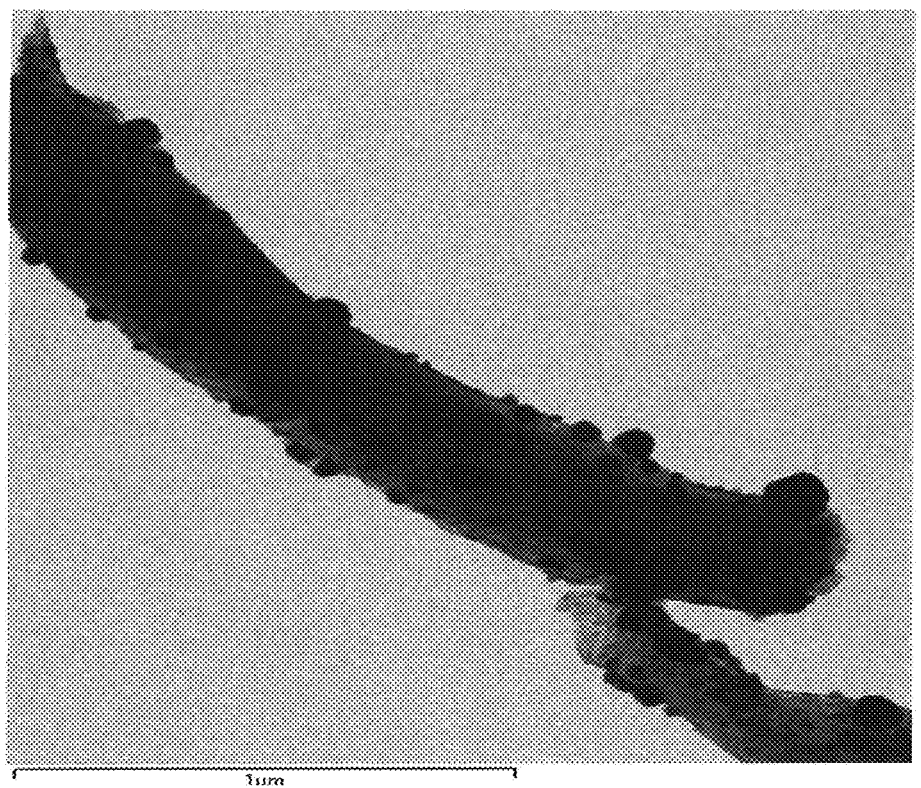
FIG. 3 is an image of an EDS (Energy Dispersive Spectroscopy) analysis of a boron nitride nanotube (BNNT) catalyst (Pt-BNNT) according to the second embodiment of the present invention.
Figure 4:
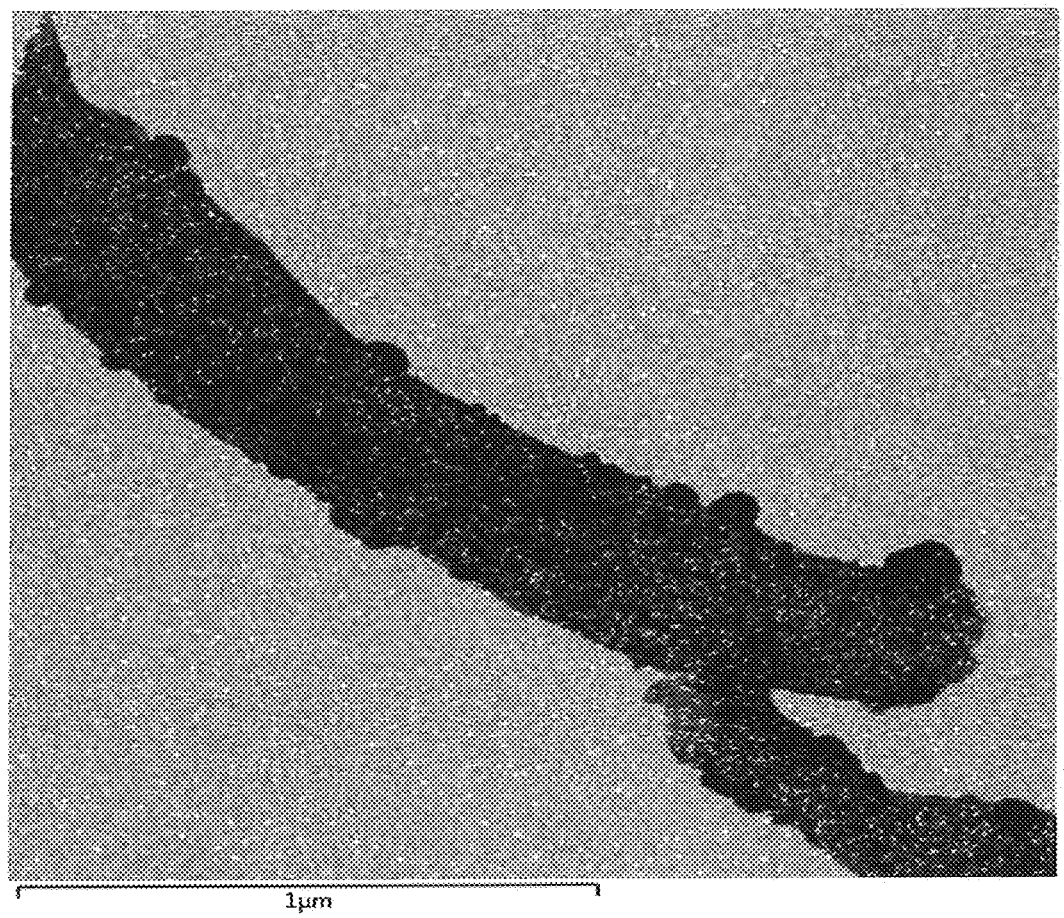
FIG. 4 is an EDS analytical layer image of a boron nitride nanotube (BNNT) catalyst (Pt-BNNT) according to the second embodiment of the present invention.

FIG. 2 is a TEM image of a boron nitride nanotube catalyst (Pt-BNNT) according to the second embodiment of the present invention. FIG. 3 is an image of an EDS analysis of a boron nitride nanotube catalyst (Pt-BNNT) according to the second embodiment of the present invention. FIG. 4 is an EDS analytical layer image of a boron nitride nanotube catalyst (Pt-BNNT) according to the second embodiment of the present invention.

Figure 5:
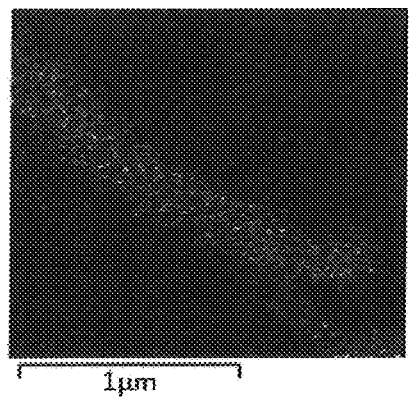
FIG. 5 is an image of boron atoms distribution in the EDS analysis of a boron nitride nanotube (BNNT) catalyst (Pt-BNNT) according to the second embodiment of the present invention.
Figure 6:
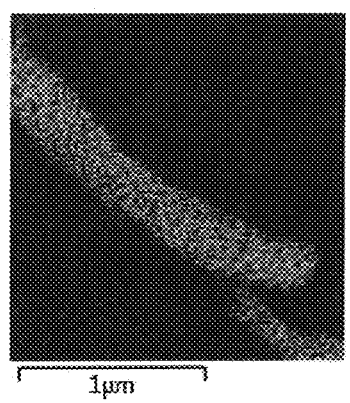
FIG. 6 is an image of nitrogen atoms distribution in the EDS analysis of a boron nitride nanotube (BNNT) catalyst (Pt-BNNT) according to the second embodiment of the present invention.
Figure 7:
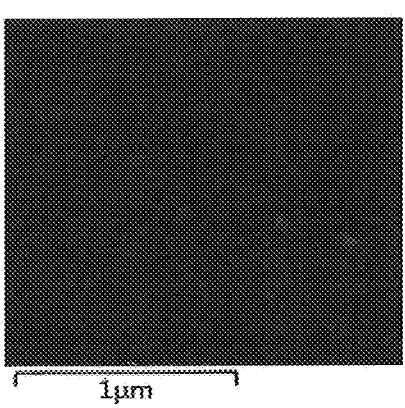
FIG. 7 is an image of a platinum atoms distribution in the EDS analysis of a boron nitride nanotube (BNNT) catalyst (Pt-BNNT) according to the second embodiment of the present invention.
Figure 8:
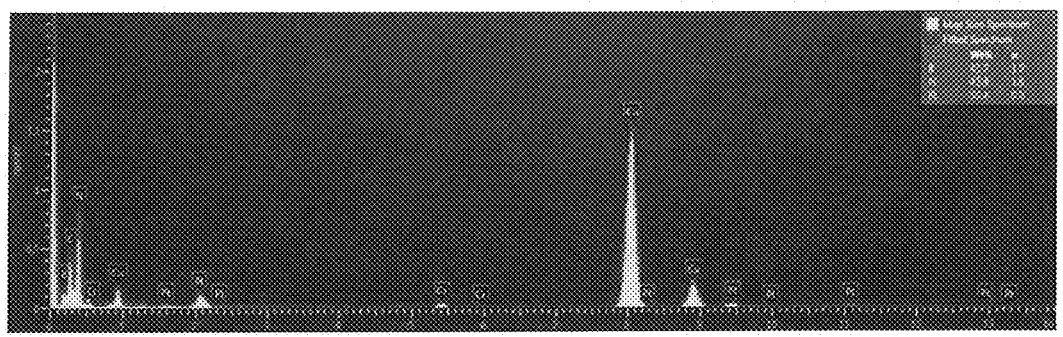
FIG. 8 is a graph of an EDS analysis of a boron nitride nanotube (BNNT) catalyst (Pt-BNNT) according to the second embodiment of the present invention.

FIG. 5 is an image of boron atoms distribution in EDS analysis of a boron nitride nanotube catalyst (Pt-BNNT) according to the second embodiment of the present invention. FIG. 6 is an image of nitrogen atoms distribution in EDS analysis of a boron nitride nanotube catalyst (Pt-BNNT) according to the second embodiment of the present invention. FIG. 7 is an image of a platinum atoms distribution in EDS analysis of a boron nitride nanotube (BNNT) catalyst (Pt-BNNT) according to the second embodiment of the present invention. FIG. 8 is an EDS analysis graph of a boron nitride nanotube catalyst (Pt-BNNT) according to the second embodiment of the present invention.

It can be confirmed that platinum (Pt) is bound to the surface of the boron nitride nanotube (BNNT) as illustrated in FIG. 2.

In addition, as illustrated in FIGS. 3 to 7, the distribution of the materials included in the boron nitride nanotubes catalyst (Pt-BNNT) can be confirmed, and as listed in Table 1 below, it can be confirmed that the platinum (Pt) particles were included in an amount of 10.35 wt %.

TABLE 1

| Materials | wt % | Atomic ratio |
|---|---|---|
| Boron (B) | 45.70 | 56.99 |
| Nitrogen (N) | 43.95 | 42.29 |
| Platinum (Pt) | 10.35 | 0.72 |
| Total | 100 | 100 |

Figure 9:
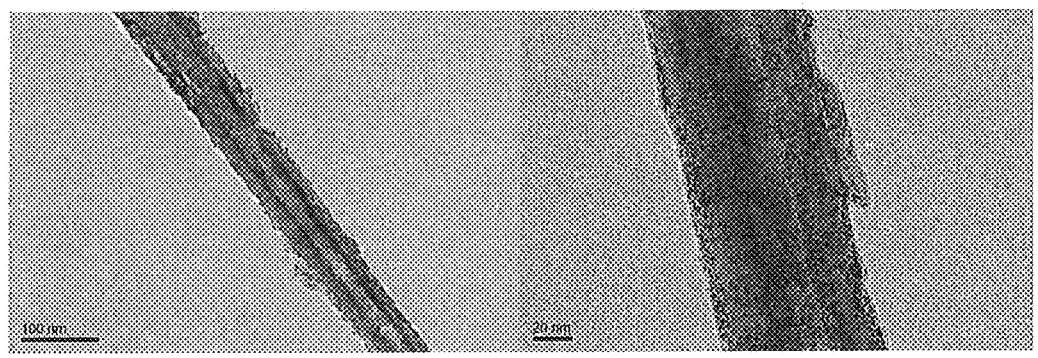
FIG. 9 is a TEM image of a boron nitride nanotube (BNNT) catalyst (Pd-BNNT) according to the fifth embodiment of the present invention.
Figure 10:
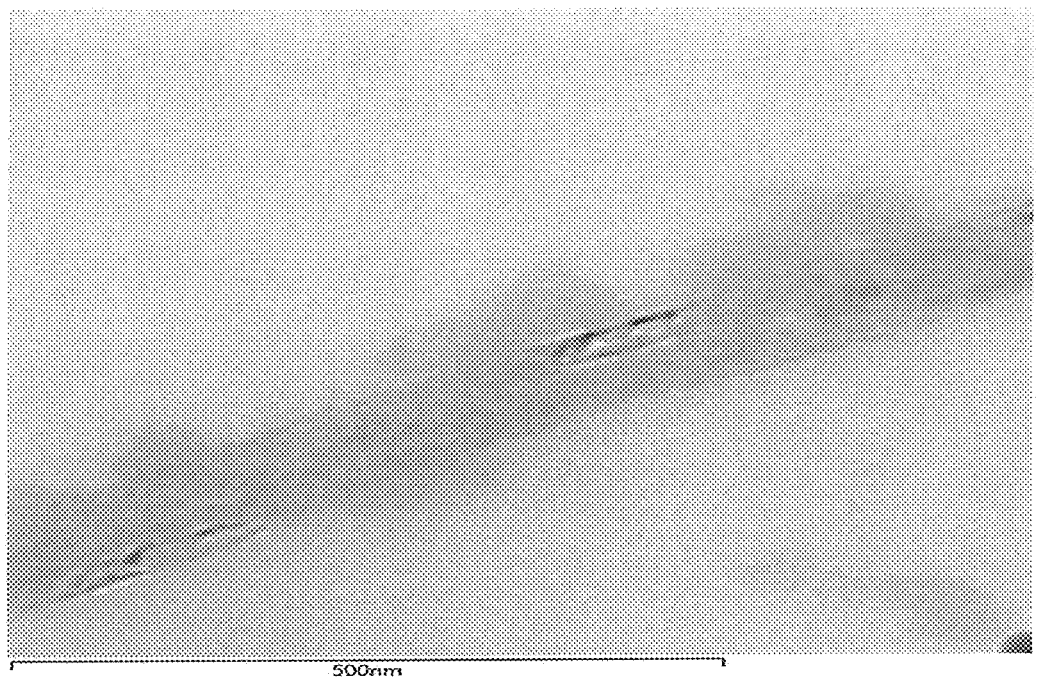
FIG. 10 is an image of an EDS analysis of a boron nitride nanotube (BNNT) catalyst (Pd-BNNT) according to the fifth embodiment of the present invention.
Figure 11:
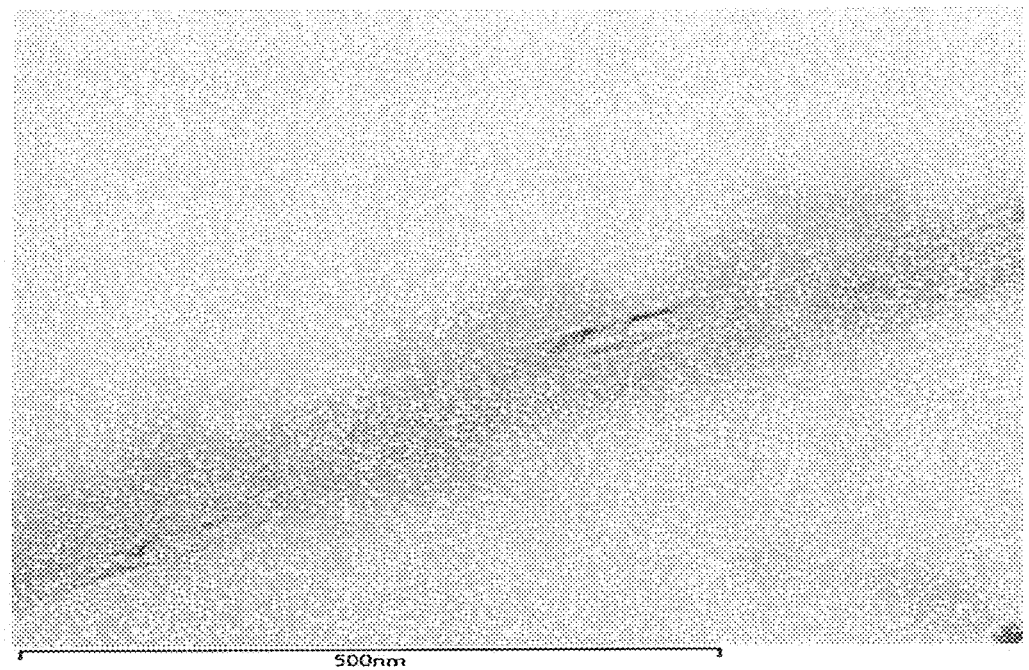
FIG. 11 is an EDS analytical layer image of a boron nitride nanotube (BNNT) catalyst (Pd-BNNT) according to the fifth embodiment of the present invention.
Figure 12:
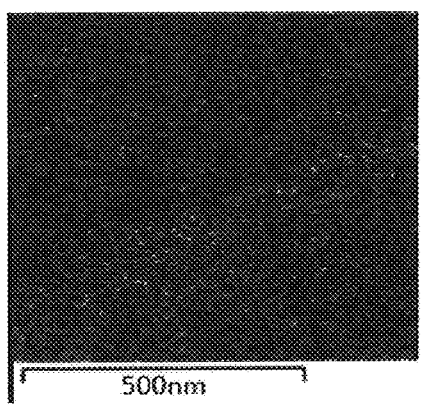
FIG. 12 is an image of boron atoms distribution in the EDS analysis of a boron nitride nanotube (BNNT) catalyst (Pd-BNNT) according to the fifth embodiment of the present invention.
Figure 13:
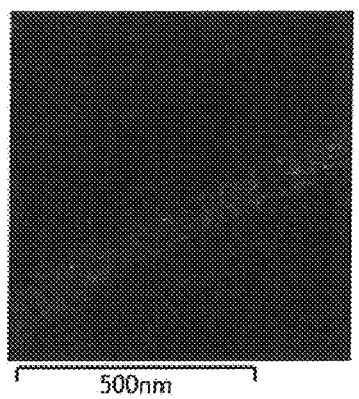
FIG. 13 is an image of nitrogen atoms distribution in the EDS analysis of a boron nitride nanotube (BNNT) catalyst (Pd-BNNT) according to the fifth embodiment of the present invention.
Figure 14:
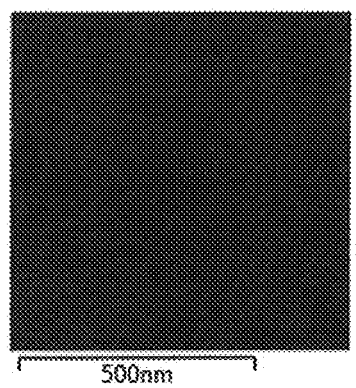
FIG. 14 is an image of a palladium atoms distribution in the EDS analysis of a boron nitride nanotube (BNNT) catalyst (Pd-BNNT) according to the fifth embodiment of the present invention.
Figure 15:
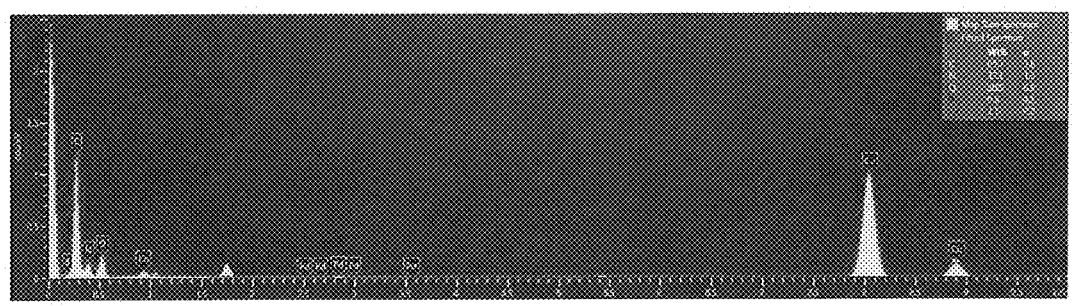
FIG. 15 is a graph of EDS analysis of a boron nitride nanotube (BNNT) catalyst (Pd-BNNT) according to the fifth embodiment of the present invention.

FIG. 9 is a TEM image of a boron nitride nanotube catalyst (Pd-BNNT) according to the fifth embodiment of the present invention. FIG. 10 is an image of an EDS analysis of a boron nitride nanotube (BNNT) catalyst (Pd-BNNT) according to the fifth embodiment of the present invention. FIG. 11 is an EDS analytical layer image of a boron nitride nanotube (BNNT) catalyst (Pd-BNNT) according to the fifth embodiment of the present invention. FIG. 12 is an image of boron atoms distribution in EDS analysis of a boron nitride nanotube (BNNT) catalyst (Pd-BNNT) according to the fifth embodiment of the present invention. FIG. 13 is an image of nitrogen atoms distribution in EDS analysis of a boron nitride nanotube (BNNT) catalyst (Pd-BNNT) according to the fifth embodiment of the present invention. FIG. 14 is an image of a palladium atoms distribution in EDS analysis of a boron nitride nanotube (BNNT) catalyst (Pd-BNNT) according to the fifth embodiment of the present invention. FIG. 15 is an EDS analysis graph of a boron nitride nanotube (BNNT) catalyst (Pd-BNNT) according to the fifth embodiment of the present invention.

As illustrated in FIG. 9, it can be confirmed that palladium (Pd) is bound to the surface of the boron nitride nanotube (BNNT).

In addition, as illustrated in FIGS. 10 to 15, the distribution of the materials included in the boron nitride nanotubes catalyst (Pd-BNNT) can be confirmed, and as listed in Table 2 below, it can be confirmed that the palladium (Pd) particles were included in an amount of 1.14 wt %. In addition, carbon (C) was detected by a carbon layer used as a grid of the TEM and oxygen (O) was detected by exposing the sample to the air.

TABLE 2

| Materials | wt % | Atomic ratio |
| --- | --- | --- |
| Boron (B) | 9.54 | 11.09 |
| Carbon (C) | 65.68 | 68.74 |
| Nitrogen (N) | 13.14 | 11.79 |
| Oxygen (O) | 10.50 | 8.27 |
| Palladium (Pd) | 1.14 | 0.13 |
| Total | 100 | 100 |

Figure 16:
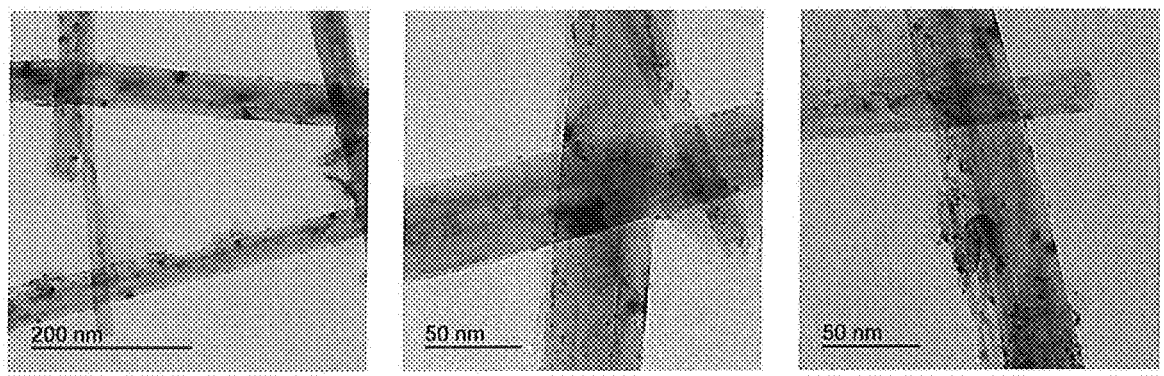
FIG. 16 is a TEM image of a boron nitride nanotube catalyst (Pd-BNNT) according to the sixth embodiment of the present invention.

FIG. 16 is a TEM image of a boron nitride nanotube catalyst (Pd-BNNT) according to the sixth embodiment of the present invention.

As illustrated in FIG. 16, it can be confirmed that low-concentration palladium (Pd) particles were bound to the surface of the boron nitride nanotubes (BNNT).

Table 3 below indicates the amount of each catalyst particle initially added to the boron nitride nanotube (BNNT) and the amount of catalyst particles bound to the boron nitride nanotube catalyst (BNNT-Pt or Pd) analyzed by ICP (Inductively Coupled Plasma)-AES (Atomic Emission Spectroscopy).

Specifically, as listed in Table 3, it can be confirmed that palladium (Pd) particles were bound in an amount of 0.52 wt %.

TABLE 3

| | Amount of catalyst particle initially added (wt %) | Amount of catalyst particles bound to boron nitride nanotube (BNNT) (wt %) |
| --- | --- | --- |
| Pt-BNNT | 2.06 | 0.21 |
| Pd-BNNT | 2.31 | 0.52 |

At this time, the amount of the Pd nanoparticles initially added was applied in a concentration of 2.31 wt % with respect to the boron nitride nanotube (BNNT), but it was finally confirmed that only the Pd nanoparticles in the amount of 0.52 wt % was bound to the boron nitride nanotube (BNNT), which means that all of the initially added materials are not bound to the boron nitride nanotube (BNNT).

As listed in Table 3, it can be confirmed that platinum (Pt) particles were bound in an amount of 0.21 wt % to the boron nitride nanotube (BNNT).

Figure 17:
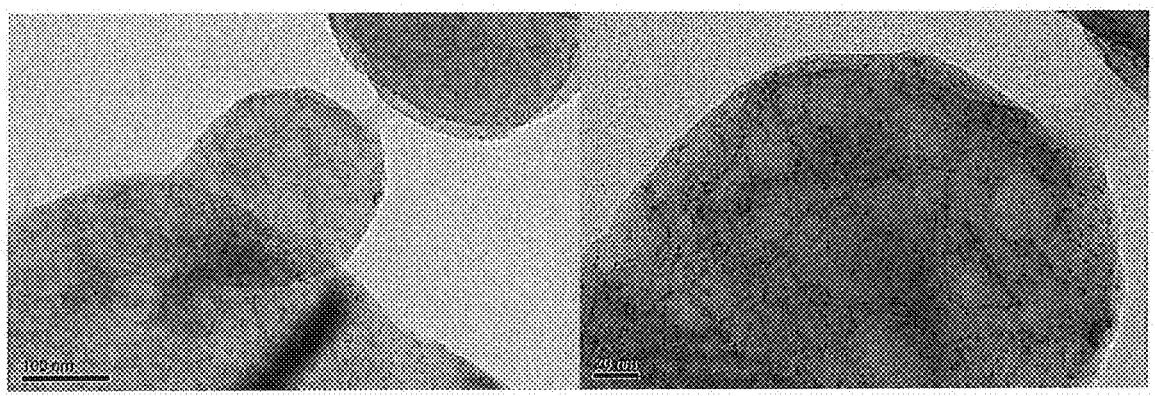
FIG. 17 is a TEM image of a boron nitride nanosheet (BNNS) catalyst (Pt-BNNS) according to the fourth embodiment of the present invention.

FIG. 17 is a TEM image of a boron nitride nanosheet (BNNS) catalyst (Pd-BNNS) according to the fourth embodiment of the present invention.

Figure 18:
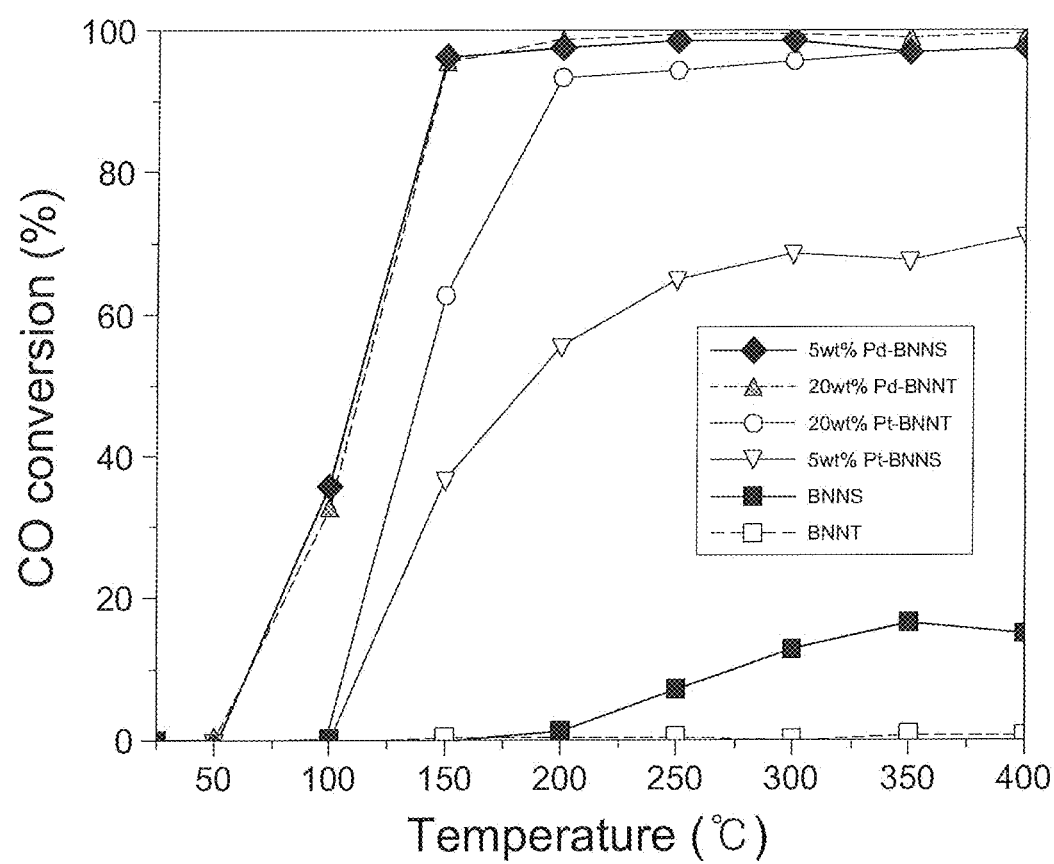
FIG. 18 is a graph of CO conversion rates according to the first, second, fourth, and fifth embodiments of the present invention.

FIG. 18 is a graph of CO conversion rates according to the first, second, fourth, and fifth embodiments of the present invention.

As illustrated in FIG. 18, in the case of pure boron nitride nanotubes (BNNT), CO conversion hardly occurs, and also in the case of pure boron nitride nanosheets (BNNS), the reaction is also observed at 250° C. or higher. However, the limit is clear in that the conversion rate is less than 20%.

On the other hand, the boron nitride nanotube catalysts (Pd-BNNT, Pt-BNNT) and the boron nitride nanosheet catalyst (Pt-BNNS) according to the second, fourth, and fifth embodiments of the present invention have a conversion rate of 90% or higher at 150° C. or higher.

Since the pure boron nitride nanostructure has a low reactivity, its role as a catalyst is limited. However, if a defect is arbitrarily produced on the surface of the boron nitride nanostructure and the metallic nanoparticles are incorporated on the defects, the reactivity increases due to the defects and the metallic nanoparticles enhancing the catalytic effect such as a CO conversion rate.

Figure 19:
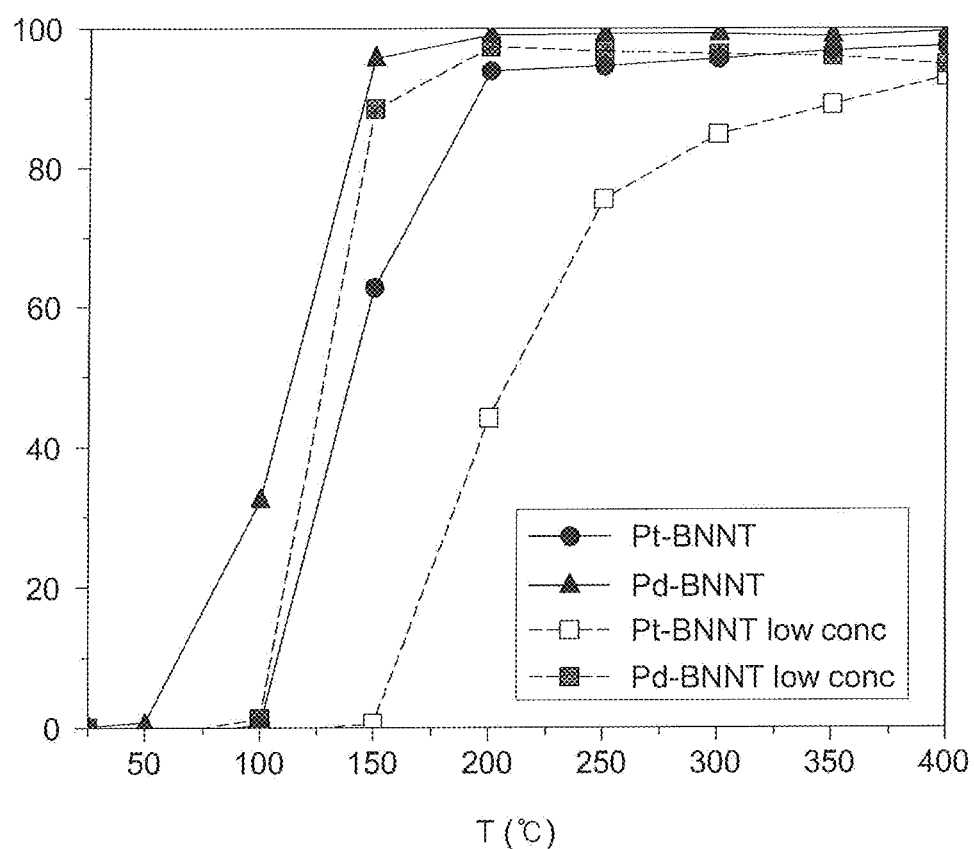
FIG. 19 is a graph of CO conversion rates of a low-concentration boron nitride nanotube catalyst according to the second, third, fifth, and sixth embodiments of the present invention.

FIG. 19 is a graph of CO conversion rates of a low-concentration boron nitride nanotube catalyst according to the second, third, fifth, and sixth embodiments of the present invention.

As illustrated in FIG. 19, it can be confirmed that although low-concentration catalyst particles were bound to the boron nitride nanotubes (BNNT), there was no difference in CO conversion rate as compared with the case where high-concentration catalyst particles were bound.

This is because the catalytic effect of the boron nitride nanotube (BNNT) itself was increased through the surface modification of the boron nitride nanotube (BNNT).

Figure 20:
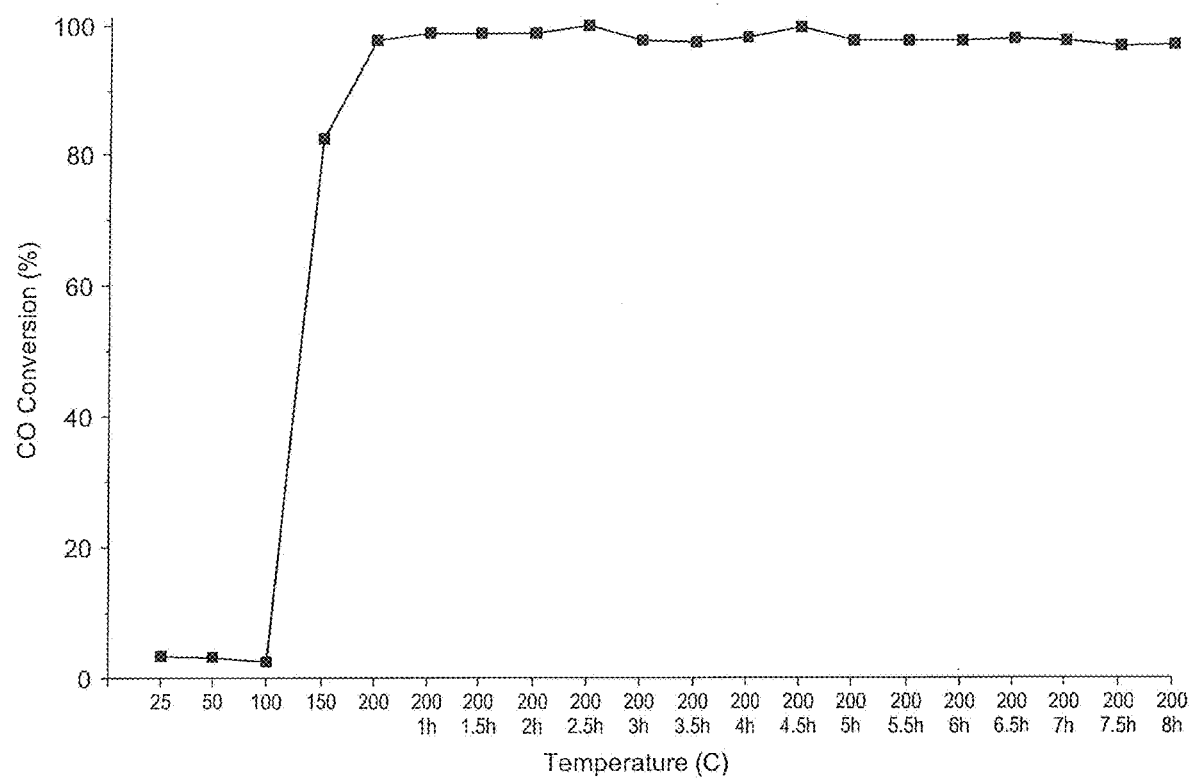
FIG. 20 is a graph of CO conversion rates of a boron nitride nanotube catalyst (Pd-BNNT) over time according to the sixth embodiment of the present invention.
Figure 21:
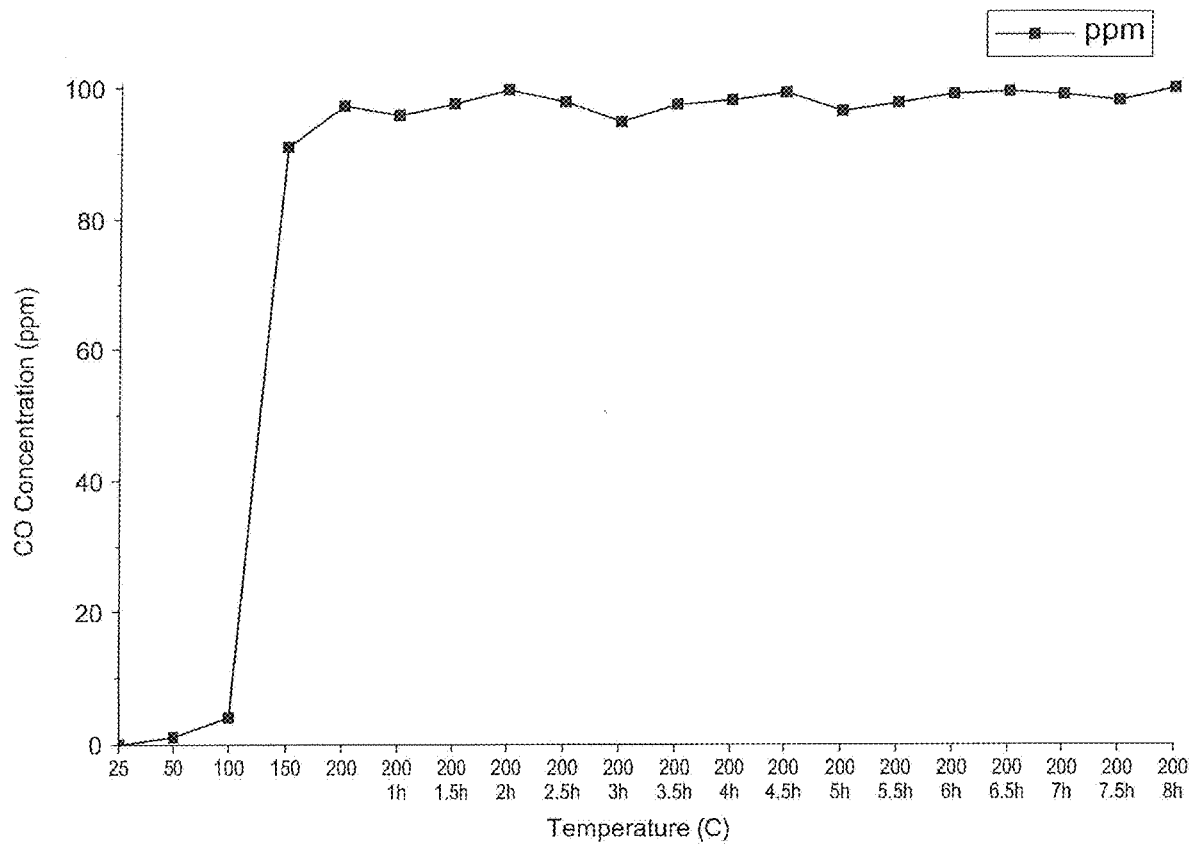
FIG. 21 is a graph of the amount of $CO_2$ production of a boron nitride nanotube catalyst (Pd-BNNT) over time according to the sixth embodiment of the present invention.

FIG. 20 is a graph of a CO conversion rate of a boron nitride nanotube catalyst (Pd-BNNT) over time according to the sixth embodiment of the present invention, and FIG. 21 is a graph of the amount of $CO_2$ production of a boron nitride nanotube catalyst (Pd-BNNT) over time according to the sixth embodiment of the present invention.

Referring to FIG. 20, it can be confirmed that the efficiency of the CO conversion rate did not decrease over time.

This is because the boron nitride nanotube (BNNT) serves as a support while simultaneously acting as a catalyst.

The boron nitride nanotube (BNNT) used as a support has characteristics such as high specific surface area, high thermal conductivity, high chemical stability, and improved flow-ability of reactants due to high porosity and maintenance of the improved flow-ability, and the like.

Therefore, there are relatively few problems, such as deformation and oxidation of the catalyst material, and the efficiency of the CO conversion rate is not reduced even over time.

Further, the boron nitride nanotubes (BNNT) are very light and its catalytic effect per unit mass is relatively high, thus having a high CO conversion rate.

It can be confirmed that the efficiency of the CO conversion rate did not decrease despite the changes in the $CO_2$ production amount illustrated in FIG. 21.

While the present invention has been described with reference to specific embodiments thereof, it will be understood by those skilled in the art that various modifications may be made therein without departing from the spirit and scope of the invention. Therefore, the scope of the present invention should not be limited by the described embodiments, but should be determined by the scope of the appended claims and equivalents thereof.

While the present invention has been described with reference to certain preferred embodiments and drawings, it will be understood by those skilled in the art that various modifications and variations may be made therein. Therefore, the ideal of the present invention should be determined only by the appended claims, and all equivalent or equivalent variations thereof fall within the scope of the ideal of the present invention.

What is claimed is:

1. A boron nitride nanostructure having a surface modified to form defects thereon;
    wherein metallic nanoparticles are formed in the defects and the metallic nanoparticles comprise one of palladium (Pd), platinum (Pt), rhodium (Rh, and vanadium (V);
    wherein defects are formed using an implosion of microbubbles at the surface of the boron nitride nanostructure through ultrasonic dispersion; and
    wherein the boron nitride nanostructure comprises boron nitride nanotubes (BNNT).

2. The surface-modified boron nitride nanostructure according to claim 1, wherein the metallic nanoparticles are included in an amount of 0.1 to 15 wt %.

3. The surface-modified boron nitride nanostructure according to claim 1, wherein the metallic nanoparticles are included in an amount of 0.1 to 3 wt %.

* * * * *